United States Patent Office 2,910,456
Patented Oct. 27, 1959

2,910,456
MOULDABLE MATERIALS

Peter Maurice Jacque Koch de Gooreynd, Tillington, Petworth, and Lionel John Saxty, Teddington, England, assignors to Peterlite Products Limited, London, England, a British company No Drawing. Application November 12, 1954
Serial No. 468,522

7 Claims. (Cl. 260—77.5)

This invention relates to mouldable materials produced from polymerizable substances and articles made therefrom.

In applications Serial Nos. 332,548 and 430,453 there have been described methods of producing mouldable materials by polymerizing a mixture of polymerizable substances to a partially polymerized form to produce a sheet or block having prescribed properties. These properties are that the partially polymerized material shall be sufficiently stable and rigid to be stored and handled, but that it shall be still capable of being shaped, for example, under heat and pressure and to be substantially completely polymerized to an infusible form. In the said applications, the polymerizable materials comprised a monomeric thermoplastic material and a monomeric thermosetting material.

An object of the present invention is to improve the properties of the mouldable material and the final article.

Another object of the invention is to provide a mouldable material comprising at least three constituents, two of which are thermosetting.

Broadly speaking, the invention employs a mixture of three polymerizable materials, one of which, when fully polymerized is a thermoplastic synthetic resin, and another two of which, when fully polymerized alone, are each a thermoset synthetic resin. The mixture of polymerizable materials are polymerized directly from a liquid or semi-liquid form to an intermediate stage in which a partially polymerized sheet or block is formed. The conditions of polymerization are such that no substantial cross-linking occurs, the polymerization being of the straight chain type; for this reason, the partially polymerized material is plastic and can be shaped. It is also sufficiently stable and rigid to be stored and handled. The partially polymerized material can be converted into infusibly shaped articles by completing the polymerization under conditions causing cross-linking.

Tri-allyl cyanurate, when added before solidification of the monomer mixture has been found to improve the properties of the partially polymerized material and also of the final products. Examples of its use are with the materials mentioned in the beforementioned applications; methylmethacrylate and allyl methacrylate, and methyl methacrylate and di-ethylene-glycol bis (allyl carbonate).

Of the polymerizable materials which, when fully polymerized alone, form a thermoplastic synthetic resin are those containing a single —C=C— linkage of the vinyl or allyl type. Examples are methyl and homologous alkyl methacrylates, styrene, vinyl acetate, methacrylic acid, allyl acetate and acrylonitrile. Similarly, the compounds which, when fully polymerized alone, form a thermosetting synthetic resin, are those containing two or more —C=C— linkages of the vinyl or allyl type. Examples are allyl methacrylate, ethylene glycol dimethacrylate and homologous glycol dimethacrylates, divinyl benzene, diallyl maleate, methacrylic anhydride, di-ethylene-glycol bis(allyl carbonate) and tri-allyl cyanurate. The invention therefore includes a method of producing a shaped article in which a mixture of monomeric materials comprising a polymerizable material which when fully polymerized alone is a thermoplastic synthetic resin and which contains a single —C=C— linkage, and two polymerizable materials each of which, when fully polymerized alone is a thermosetting synthetic resin and contains two or more —C=C— groups is polymerized directly to a partially polymerized sheet or block form under conditions preventing substantial cross-linking, the sheet or block being sufficiently stable and rigid to be stored and handled while still being sufficiently plastic to be shaped under heat and pressure, and shaping the partially polymerized material to the desired form and substantially completing the polymerization to produce a cross-linked infusible copolymer, the constituents of the mixture and the proportions thereof being such as to produce the stated properties in the partially polymerized material to produce a strong, heat resistant final copolymer.

Although reference has been made above to the use of a single thermoplastic constituent in the polymerizable mixture, it will be understood that two or more thermoplastic constituents may be employed in addition to the thermosetting constituents. The number of thermosetting substances in the monomer mixture can also exceed two and this may be desirable where a special effect is desired in the intermediate or final product, such as pigment compatibility, for which purpose methacrylic anhydride is added to the usual thermoplastic constituent such as methylmethacrylate.

Usually, the intermediate and final products are homogeneous materials and are advantageously transparent. However, if desired, fibres, fillers or pigments may be included before solidification to the intermediate product to strengthen or otherwise modify the properties of the final product.

The conditions of time, temperature, catalyst concentration, nature of catalyst, nature of polymerizable materials and their concentrations, all of which govern the production of an intermediate mouldable material of the type described, are found by experiment. Having been found, it is possible to achieve reproducibility of the intermediate co-polymer by measuring some physical property such as power factor or refractive index of the ideal intermediate material, and subsequently to polymerize with continuous measurement of that property until the value corresponding to that found on the ideal sheet has been reached. This permits a more accurate method of control than repetition of a time temperature cycle. In particular, the concentration and choice of the catalyst or mixture of catalysts employed to produce the intermediate and final product is governed by the nature of the constituents in the initial polymerizable mixture, their concentrations and also the method of final polymerization. If ultra violet light is to be used in the final polymerization then a benzoin type of catalyst will be used. Where heat alone is to be used a peroxy or hydroperoxy type catalyst will be employed, and will be incorporated before and/or after the syrup is formed. For many materials within the scope of the invention benzoyl peroxide has been found to be a suitable catalyst. For resins incorporating an appreciable percentage of di-ethylene-glycol bis(allyl carbonate), benzoyl peroxide is used in the region of 3.0% concentration, and for co-polymers comprising allyl methacrylate and tri-allyl cyanurate it is used in concentrations from 0.5% to 2.0%.

As regards the relative proportions of the materials in the polymerizable mixture, these are best determined by experiment since they vary considerably with the nature of the constituents. It should be noted, however, that there is a limit to the total amount of thermosetting material or materials to be included in the mixture. Beyond certain limits, which are found by experiment, it becomes impossible to obtain the intermediate material in mouldable form due to the excessive amount of cross-linking in the early stages of polymerization. As before stated, the conditions of polymerization, as well as the other factors of the mixture, are selected to ensure that there is only a small amount of cross-linking in the intermediate mouldable product. In addition, the amount of the thermosetting constituents which can be introduced is influenced by the choice of thermoplastic constituent or constituents. Using methyl methacrylate with di-ethylene-glycol bis(allyl carbonate) and tri-allyl cyanurate it is possible to include up to 75% thermosetting constituents in the mixture, provided the percentage of tri-allyl cyanurate is small.

In addition to modifying and improving the properties in the finally shaped product, the addition of a second thermosetting constituent to the polymerizable mixture often results in the intermediate product having greater mouldability.

The invention will be more readily understood from the following examples of making mouldable materials and shaped articles therefrom.

Example I

The polymerizable mixture consisted of the following monomers:

45 parts di-ethylene-glycol bis(allyl carbonate)
20 parts tri-allyl cyanurate
35 parts methyl methacrylate To this mixture was added 3% benzoyl peroxide and the resulting mix was heated at 80° C. for 20 minutes. The resulting syrup was cooled rapidly and poured into a prepared mould where it was heated for 72 hours at 50° C. The solidified cast material was removed from the mould and can be stored substantially indefinitely. It is sufficiently rigid to be mechanically worked if desired and can be softened and shaped by heating to 100° C. The shaped product is rendered infusible by heating to 150° C.

Example II

A mixture of equal parts of allyl-methacrylate and methyl-methacrylate monomers to which 0.1% of benzoyl peroxide had ben added was heated for 15 minutes at 80° C. followed by rapid cooling to produce a pourable syrup. To this syrup was added 3% tri-allyl cyanurate which had been melted by heating to 30° C. The mixture was poured into a prepared sheet mould and heated at 40° C. for 45 hours, after which time a firm mouldable sheet with good surfaces was produced. This sheet can be worked and can be stored but can be softened and shaped to the desired form by heating to a suitable temperature. Curing of the sheet to infusible form can be effected by heating to 150° C.

A sheet produced from the same syrup, but without the addition of the tri-allyl cyanurate showed many surface defects after heating at 40° C. for 45 hours.

Example III

The polymerizable mixture consisted of the following monomers:

45 parts di-ethylene-glycol bis(allyl carbonate)
20 parts tri-allyl cyanurate
25 parts methyl methacrylate
10 parts n.-butyl methacrylate To this mixture was added 3% benzoyl peroxide and the resulting mix was heated at 75° C. for 25 minutes. The resulting syrup was cooled rapidly and poured into a prepared mould, where it was heated for 72 hours at 50° C. The resultant cast material was removed from the mould and was rigid enough to be machined and handled. Heating to 100° C. softened this material, enabling it to be shaped. Further heating at 150° C. rendered the material substantially infusible.

Example IV

A syrup of methyl methacrylate was prepared by heating monomer containing 0.1% benzoyl peroxide at 80° C. with constant stirring. To 35 parts of this syrup were added 45 parts di-ethylene-glycol bis(allyl carbonate) and 20 parts tri-allyl cyanurate. To the resultant viscous mixture was added 3% benzoyl peroxide. The mix was poured into a glass mould and heated for 72 hours at 50° C. At the end of this period, the solid cast material was removed and could be softened by heating to 100° C. Heating to 150° C. produced a hard, substantially infusible polymer which had some superior mechanical properties to those of the material of Example I.

Example V

To a mixture of 45 parts of di-ethylene-glycol bis(allyl carbonate), 20 parts tri-allyl cyanurate was added 3% benzoyl peroxide. The mixture was heated to 80° C. for 15 minutes and the resultant syrup cooled rapidly. To this syrup was added 35 parts methyl methacrylate containing 3% benzoyl peroxide. The addition of the methyl methacrylate caused a drop in viscosity which was further increased by a short period of heating at 80° C. The syrup was poured into a glass mould and heated for 70 hours at 50° C. At the end of this period, the solid cast material was removed from the mould and could be softened and shaped by heating to 100° C. Further heating at 150° C. rendered the material substantially infusible and gave it a hardness superior to that of the materials of Examples I and IV.

Example VI

The polymerizable mixture consisted of the following monomers:

45 parts allyl methacrylate
5 parts di-allyl maleate
50 parts methyl methacrylate To this mixture was added 0.1% benzoyl peroxide and the resultant mix heated at 80° C. for 20 minutes. The resultant syrup was cooled rapidly and poured into a prepared mould where it was heated for 45 hours at 40° C. After this time, the cast material was removed from the mould and could be softened and shaped by heating to 100° C. Further heating rendered the material substantially infusible.

Example VII

The polymerizable mixture consisted of the following monomers:

35 parts tri-allyl-cyanurate
35 parts allyl methacrylate
30 parts methyl methacrylate To this mixture was added 0.5% benzoyl peroxide and the mix heated at 80° C. for 15 minutes. The resultant syrup was cooled rapidly and poured into a prepared mould which was heated at 40° C. for 62 hours. At the end of this time the cast material was removed from the mould and could be softened and shaped by heating to 100° C. Further heating at 150° C. produced a material which was substantially infusible and possessed considerable hardness.

Throughout this specification reference has been made to the use of heat and pressure for converting the partial polymerized material to the final thermoset product. In place of the application of external heat, the material may be subjected to the effect of high energy radiation, such as bombardment with γ particles, X-rays and like high velocity particles, as by exposing them to a cobalt 60 source. This radiation may serve to supply some of the energy required for polymerization.

We claim:

1. A method of producing a moldable material comprising making a mixture of at least three copolymerizable monomeric materials one of which is an alkyl methacrylate and two others of which are tri-allyl cyanurate and a member of the group consisting of allyl methacrylate, ethylene glycol dimethacrylate and homologous glycol dimethacrylates, divinyl benzene, diallyl maleate, methacrylic anhydride and di-ethylene glycol bis (allyl carbonate), and polymerizing said mixture to produce a partially polymerized mass which is sufficiently stable and rigid to be handled but which is still sufficiently thermoplastic to be shaped.

2. The method defined in claim 1, in which the alkyl methacrylate copolymerizable monomeric material is methyl methacrylate and in which the two other copolymerizable monomeric materials are tri-allyl cyanurate and di-ethylene-glycol bis (allyl carbonate).

3. The method defined in claim 1, in which the alkyl methacrylate copolymerizable monomeric material consists essentially of methyl methacrylate and n-butyl methacrylate and in which the two other copolymerizable monomeric materials are tri-allyl cyanurate and di-ethylene-glycol bis (allyl carbonate).

4. The method defined in claim 1, in which the alkyl methacrylate copolymerizable monomeric material is methyl methacrylate and in which the two other copolymerizable monomeric materials are tri-allyl cyanurate and allyl methacrylate.

5. A moldable material consisting of the stable and solid but thermoplastic partial polymerization product produced by partially copolymerizing a mixture of at least three copolymerizable materials one of which (1) is an alkyl methacrylate and two others of which are (2) tri-allyl cyanurate and (3) a member of the group consisting of allyl methacrylate, ethylene glycol dimethacrylate and homologous glycol dimethacrylates, divinyl benzene, diallyl maleate, methacrylic anhydride and di-ethylene-glycol-bis (allyl carbonate), the alkyl methacrylate component amounting to from about 30 to about 48.5% by weight and the sum of the amounts of the two other components being from about 51.5 to about 70% of the total, the amount of tri-allyl cyanurate being from 3 to 35% of the total, said moldable material being rendered plastic by heating to a temperature of about 100° C.

6. The moldable material defined in claim 5, in which said two other components are tri-allyl cyanurate about 20% and di-ethylene-glycol bis (allyl carbonate) about 45% of the total.

7. The moldable material defined in claim 5, in which said two other components are tri-allyl cyanurate from 3 to 35% and allyl methacrylate from 48.5 to 35% of the total, the sum of the amounts of said two other components being from 51.5% to 70% of the total.

References Cited in the file of this patent

UNITED STATES PATENTS

| | | |
|---|---|---|
| 2,202,846 | Garvey | June 4, 1940 |
| 2,273,891 | Pollack et al. | Feb. 24, 1942 |
| 2,370,578 | Pollack et al. | Feb. 27, 1945 |
| 2,379,247 | Muskat | June 26, 1945 |
| 2,379,248 | Muskat | June 26, 1945 |
| 2,496,097 | Kropa | Jan. 31, 1950 |
| 2,557,667 | Kropa | June 19, 1951 |